United States Patent [19]

Shell

[11] Patent Number: 4,559,149

[45] Date of Patent: Dec. 17, 1985

[54] WORKOVER FLUID

[75] Inventor: Francis J. Shell, Bartlesville, Okla.

[73] Assignee: Phillips Petroleum Company, Bartlesville, Okla.

[21] Appl. No.: 618,296

[22] Filed: Jun. 7, 1984

Related U.S. Application Data

[63] Continuation-in-part of Ser. No. 445,311, Nov. 29, 1982, abandoned.

[51] Int. Cl.$^4$ .............................................. E21B 43/00
[52] U.S. Cl. .............................. 252/8.55 R; 166/297; 252/8.5 A
[58] Field of Search ................... 166/291, 283, 282; 252/8.5 A, 8.5 C, 8.55 R

[56] References Cited

U.S. PATENT DOCUMENTS

| | | | |
|---|---|---|---|
| 2,343,113 | 2/1944 | Jones | 252/8.5 |
| 2,393,166 | 1/1946 | Hoeppel | 252/8.5 |
| 2,639,274 | 5/1953 | Salathiel | 252/8.5 X |
| 3,359,225 | 12/1967 | Weisend . | |
| 3,613,790 | 10/1971 | Stout et al. | 166/294 |
| 3,719,601 | 3/1973 | Jacocks | 252/8.55 R |
| 3,804,174 | 4/1974 | Chatterji | 166/293 |
| 3,804,760 | 4/1974 | Darley | 252/8.55 R |
| 3,820,602 | 6/1974 | Motley | 166/291 |
| 3,827,978 | 8/1974 | Miles | 252/8.55 R |
| 3,878,895 | 4/1975 | Wieland et al. | 166/294 |
| 3,891,565 | 6/1975 | Colpoys | 252/8.55 |
| 4,012,328 | 3/1977 | Hunter et al. | 252/855 R |
| 4,083,407 | 4/1978 | Griffin et al. | 252/8.55 X |
| 4,164,426 | 8/1979 | Sinka et al. | 106/90 |
| 4,172,801 | 10/1979 | Jackson | 252/8.5 |
| 4,192,753 | 3/1980 | Pye et al. | 252/8.5 A |
| 4,217,229 | 8/1980 | Watson | 252/8.55 |
| 4,302,341 | 11/1981 | Watson | 166/291 X |
| 4,304,300 | 12/1981 | Watson | 166/291 |

*Primary Examiner*—Herbert B. Guynn
*Attorney, Agent, or Firm*—Howard D. Doescher

[57] ABSTRACT

The high temperature water loss property of alkaline well completion and well workover fluids is improved by the addition of an effective amount of a naphthalene sulfonate formaldehyde condensate in the form of its monovalent or bivalent metal salts.

15 Claims, No Drawings

WORKOVER FLUID

BACKGROUND OF INVENTION

This is a continuation-in-part application of my co-pending application having Ser. No. 445,311, filed Nov. 29, 1982, now abandoned.

FIELD OF INVENTION

This invention relates to the drilling and servicing of wells and more particularly to aqueous well completion and workover fluids for use in drilling wells drilled into such formations. In accordance with another aspect, this invention is concerned with the addition of water loss additives to well workover and well completion fluids.

In the servicing of wells drilled into subterranean formations, clear water and various brines and viscous aqueous solutions have been proposed as well completion and workover fluids. These fluids generally do not possess the requisite properties of density, viscosity, gel strength, stability and low fluid loss desired for these applications. Hence, need exists for a non-damaging well completion-workover fluid having said requisite properties for use in completing wells drilled through permeable strata and in conducting workover and similar operations in such wells but which will not result in any formation damage to said permeable strata.

Accordingly, it is an object of this invention to provide improved well completion and well workover fluids.

Another object of this invention is to provide substantially clay-free well completion and well workover fluids.

Another object of this invention is to provide well completion and well workover fluids exhibiting low fluid loss properties.

Other objects, aspects, as well as the several advantages of the invention will be apparent upon reading the specification and the appended claims.

According to the invention, an effective amount of at least one naphthalene sulfonate formaldehyde condensate (NSFC) is added to packer and workover fluids to improve water loss control.

In accordance with the invention, the high temperature water loss property of alkaline clay-free well workover and well completion fluids is improved by the addition of a water loss reducing amount of an additive selected from metal salts of naphthalene sulfonate formaldehyde condensates.

In accordance with a specific embodiment of the invention, the high temperature water loss property of clay-free well workover and well completion fluids comprising water, an electrolyte, such as sodium chloride, an acid soluble weighting agent, such as calcium carbonate, an acid soluble suspending agent, such as asbestos, a polymeric viscosifier, such as carboxymethyl cellulose, and an alkaline reagent, such as $Na_2CO_3$, is improved by the addition of monovalent and bivalent metal salts of condensation products of naphthalenesulfonic acid with formaldehyde.

In accordance with the invention, it has been found that the metal salts of naphthalene sulfonate formaldehyde condensates are effective high temperature water loss control additives for clay-free wellbore completion and workover fluids.

The high temperature water loss control additives of the invention can be defined broadly as naphthalene sulfonate formaldehyde condensates. These are also known as sulfonated condenstion products of formaldehyde and naphthalene or salts thereof having molecular weights varying between about 300 and about 3,000. The additives of the invention are also known as metal salts of condensation products of naphthalenesulfonic acid with formaldehyde. Naphthaleneformaldehyde sulfonic acid can be prepared by reacting a mixture of naphthaleneformaldehyde condensate and sulfuric acid. The metal naphthaleneformaldehyde sulfonate can be prepared by reacting a metal oxide or other metal salt with an aqueous solution of naphthaleneformaldehyde sulfonic acid to obtain the desired metal. Presently preferred metal salts are the alkali metal salts. Mixtures of the additives can be used, if desired.

Condensed naphthalene sulfonates suitable for use in the present invention are marketed by a number of companies under various trade names and the preparation of some of these are set forth, for example, in U.S. Pat. No. 3,537,869; U.S. Pat. No. 3,686,133; U.S. Pat. No. 4,036,839; and U.S. Pat. No. 4,184,887; all of which are incorporated herein by reference. The naphthalene sulfonate formaldehyde condensate (NSFC) is commercially available as Lomar, CFR-2, Tamol, SM and TIC. Two of these, TIC and CFR-2, may contain an antifoaming agent (U.S. Pat. No. 3,820,602 and U.S. Pat. No. 3,804,174). In the case of CRF-2, the polyvinylpyrrolidone (PVP antifoaming agent) may also prevent the separation of free water from cement slurries (U.S. Pat. No. 3,359,225). Lomar is a tradename for unblended sodium NSFC. A letter suffix is used to designate viscosity grades.

The amount of additive present in the instant compositions is an effective amount sufficient to reduce the water loss properties of well completion and well workover fluids. The use of naphthalene sulfonate formaldehyde condensates in the inventive compositions is effective at a concentration of at least 0.5 lb/bbl up to about 10 lb/bbl total composition. In compositions for high temperature water loss control, the amount of additive varies from about 0.5 to about 6 lb/bbl.

The electrolyte can be a water soluble inorganic salt such as the halide and nitrate salts of sodium and potassium together with the ammonium salts including sodium chloride, potassium chloride, sodium bromide, potassium bromide, sodium nitrate, ammonium nitrate, ammonium chloride, ammonium bromide and the like and mixtures thereof. Saturated sodium chloride solution is presently preferred as the base fluid in the inventive compositions which exhibit densities in the range of about 10 to 14 lb/gal after the addition of selected acid soluble weighting agents. Sea water can be used for preparation of workover fluids with densities in the range of about 9 to 14 lb/gal. Thus, the instant invention is applicable to improving the water loss properties of workover fluids having densities in the range of about 9 to about 14 lb/gal.

Weighting agents which are completely acid soluble such as $CaCO_3$, $BaCO_3$ and iron carbonate are used in the inventive compositions to give densities in the above recited ranges. These additives are completely acid soluble and can be dissolved and back flushed with acid from subterranean formations to prevent formation damage or plugging. Presumably such undesirable formation damage can occur with workover operations using fluids comprising non acid-soluble weighting agents such as barium sulfate. Ideally, a workover fluid should contain no solids, however, the addition of insoluble weighting agents is frequently necessary to raise fluid density to the desired level. The less preferred ferric and ferrous oxides can also be used as weighting agents in the inventive compositions. Ferrous oxide is preferred over ferric oxide because of the former's greater solubility in 15 percent HCl which is the fluid frequently used to correct formation damage.

The amount of weighting agent employed can vary appreciably and will be sufficient to provide compositions having the desired densities. In general, the amount can range from about 15 lb/bbl to about 400 lb/bbl of fluid, preferably about 160 lb to about 380 lb/bbl of fluid.

Suitable viscosity characteristics can be imparted to the inventive compositions by the use of viscosity additives comprising natural water dispersible polymers such as guar gum, cellulose ethers such as carboxymethyl cellulose, biopolymers and the like. Representative examples of suitable cellulose ethers and biopolymers that can be used are set forth in U.S. Pat. No. 3,785,437 which is incorporated herein by reference. With these viscosity additives the carrying capacity of the fluid will vary in the agitated and non-agitated states, thus, for example, in a non-agitated separating tank, the accumulated fluid loses its carrying capacity and sand, debris and the like drop out whereas the agitated fluid has sufficient carrying capacity to carry cuttings and the like to the surface should the fluids be used for such purposes. These viscosity-increasing additives exhibit effectiveness as water-loss agents in general, however, in the present compositions the overall high temperature water-loss property of the fluids is greatly improved by the addition of naphthalene sulfonate formaldehyde condensates.

The amounts of polymeric viscosifier employed in completion and workover fluids can vary appreciably and are known in the art and generally range from about 0.25 lb to about 3 lb/bbl of fluid, preferably from about 0.75 lb to about 2 lb/bbl.

The aqueous well completion and workover fluids of the invention contain sufficient alkaline material to provide the desired alkalinity. The amount of alkaline material present in the fluids can vary depending upon the alkaline reagent added but will be sufficient to provide initially a pH of about 9, preferably 10 to 12. The amounts added ordinarily will range from about 0.1 to about 10 lb/bbl, preferably from about 2 to about 7 lb/bbl as for example when sodium carbonate is employed. In the working examples hereinbelow, initial pH values were on the order of 10. After thermal aging, pH values were in the range of 8 to 9.

Suitable alkaline materials include ammonia, compounds of alkali metals such as hydroxides, carbonates, bicarbonates, orthosilicates, silicates, phosphates, and borates or other known alkaline materials. The carbonates, such as sodium carbonate, are often used for this purpose.

Whereas asbestos is preferred as an acid soluble suspending agent for the weighting material in the inventive compositions other suspending agents such as ground paper can also be used. In this role asbestos is relatively inexpensive and the desirable flow characteristics (rheological properties) of the fluid systems are maintained. Of the various types of asbestos which are commercially available the asbestos derived from chrysotile is presently preferred. The chrysotile asbestos fibers provide maximum carrying or suspending properties with a minimum of asbestos.

The amounts of suspending agents employed in completion and workover fluids are known in the art and generally range from about 1 lb to about 3 lb/bbl of fluid, preferably from about 1.5 lb to about 2.5 lb/bbl.

The completion and workover fluid compositions of this invention are prepared by admixing the desired proportion of the various ingredients with water. All of the ingredients are fairly readily dissolved or dispersed in water by circulation through the conventional mixing equipment of a rotary drilling rig.

EXAMPLE I

A base mud comprising saturated salt water, 2 lb/bbl carboxymethyl cellulose, 2 lb/bbl asbestos fiber, 5 lb/bbl sodium carbonate and weighted with 295 lb/bbl ground limestone was prepared. Two commercial grades of the naphthalene sulfonate formaldehyde condensate (NSFC): Lomar (an unblended material) and CFR-2 (a blend containing a polyvinylpyrrolidone antifoaming agent), were mixed into aliquots of the base mud. The materials were run at concentrations of 1 and 5 lb/bbl. Test results are summarized in Table I.

TABLE I

| Run No. | NSFC, lb/bbl | 300 F. Aging, Days | Bleeding mL | SS[a] | PV/YP[b] | Gels[c] | WL[d] | pH |
|---|---|---|---|---|---|---|---|---|
| 1 | — | 0 | — | — | 80/16 | 1/3 | 4.8 | 10.4 |
|   |   | 0.6 | 8.6 | 140 | 37/8 | 1/13 | 30 | 8.9 |
| Part A: Lomar* |
| 2 | 1 | 0 | — | — | 76/34 | 2/3 | 4.0 | 10 |
|   |   | 0.6 | 27 | 170 | 45/16 | 2/19 | 16.8 | 8.7 |
| 3 | 5 | 0 | — | — | TTTM[e] | 12/13 | 2.0 | 10.1 |
|   |   | 0.6 | | | Too foamy to measure | | | |
| Part B: CFR-2** |
| 4 | 1 | 0 | — | — | 78/25 | 3/5 | 3.6 | 10.5 |
|   |   | 0.6 | 15.5 | 80 | 59/17 | 3/9 | 16 | 8.9 |
| 5 | 5 | 0 | — | — | 78/22 | 2/6 | 2.6 | 10.2 |
|   |   | 0.6 | 30 | 220 | 68/19 | 2/20 | 11 | 8.5 |

[a]Shear strength, lb/100 sq. ft. (shear strength and bleeding are not measured initially.)
[b]Plastic viscosity, cp,/yield point, lb/100 sq. ft.
[c]Gel strength, lb/100 sq. ft. (initial/10 minute)
[d]Water loss, ml in 30 min.
[e]Too thick to measure.
*NSFC is not blended with an antifoaming agent.
**NSFC is blended with polyvinylpyrrolidone (PVP) as an antifoaming agent.

Referring to the results in Table I, it is evident that for higher concentrations of NSFC an antifoaming agent such as polyvinylpyrrolidone (PVP), is necessary.

Initially the fluid of run 3 with 5 lb/bbl of unblended NSFC (Lomar ST) had a viscosity too high to be measured with a Fann VG meter, model 35. This is because of the fine foam entrapped in the sample. The initial gel strength is high because of this foam. After this fluid had been aged overnight at 300 F., it was so foamy that none of the properties could be measured. The properties of the fluid in run 5 with 5 lb/bbl of NSFC containing a polyvinylpyrrolidone defoamer (CFR-2) were normal and no foaming was experienced. There was only a small amount of foaming in run 2. The sample was sprayed with an aerosol defoamer before and after aging. This is a standard laboratory procedure. Since an antifoaming agent is desirable, although, at low concentrations, not a necessary component of the system, CFR-2 was used as the water loss control additive in the remainder of the examples. Again referring to the results in Table I and especially to the water loss value after thermal aging, it is evident that the CFR-2 improves high temperature water loss control, i.e., 30 (no additive in run 1) is significantly greater, respectively, than 16 (1 lb/bbl CFR-2 in run 4) and 11 (5 lb/bbl CFR-2 in run 5). The 5 lb/bbl loading of CFR-2 seems to be an over-treatment with respect to shear strength control which increased from 80 at the 1 lb/bbl level (run 4) to 220 at the 5 lb/bbl loading (run 5). The yield point (YP) values of runs 2–5 with NSFC are greater than those for the base mud. Referring to the same runs 1, 4 and 5 again after the thermal aging tests, a YP value of 7 in run 1 is significantly lower, respectively, than YP value of 17 and 19 in runs 4 and 5. When the amount of bleeding is considered, runs 4 and 5 with bleeding values of 15.5 and 30, respectively, show that NSFC in run 5 with PVP (CFR-2) increases bleeding compared to 8.6 in the base mud (run 1). The main value of the additive polyvinylpyrrolidone (PVP) in the workover fluids is as an antifoaming agent. Referring to the pH values in Table I, it is evident that all of the compositions were distinctly alkaline.

The compositions of this invention are useful when a permeable subterranean formation is exposed as in the case of perforating or some workover operations or said formation has the potential of being exposed as in the case of a packer fluid. In its broadest application the process of this invention comprises circulating the aforesaid composition in a well to the zone in question and then returning the fluid or a major portion thereof to the surface either during the present operation or during subsequent future operations. The treatment can comprise a single temporary and selective step or it can be an integral part of a comprehensive process. The fluid compositions of this invention can be effectively used at elevated temperatures as well workover and well completion fluids in oil and gas wells. In workover applications, the fluid of the invention is circulated from the surface to a zone where remedial work is occurring and at least a portion of the fluid is returned to the surface.

The following examples further demonstrate the operability of the instant compositions.

EXAMPLE II

The naphthalene sulfonate formaldehyde condensate (commercially available as CFR-2) was mixed into a base fluid comprising saturated salt water weighted with 295 lb/bbl ground limestone and also containing 2 lb/bbl carboxymethyl cellulose, 2 lb/bbl asbestos fiber and 5 lb/bbl sodium carbonate. The two inventive fluid samples (Runs 7 and 8) tested contained, respectively, 1 lb/bbl and 5 lb/bbl of said CFR-2. Test results are summarized in Table II. The designation CFR-2 represents the naphthalene sulfonate formaldehyde condensate additive in combination with polyvinylpyrrolidone (PVP).

TABLE II

| Run No. | CFR-2 lb/bbl | 300 F. Aging Days | Shear[a] Strength | PV/YP[b] | Gels[c] | Water Loss[d] mL/30 min | pH |
|---|---|---|---|---|---|---|---|
| 6 | 0 | 0 | — | TTTM[e] | 43/59 | 4.0 | 10.0 |
|   |   | 3 | 650 | 40/22 | 32/92 | 54.0 | NM* |
| 7 | 1 | 0 | — | TTTM[e] | 30/42 | 3.8 | 10.0 |
|   |   | 3 | — | 69/36 | 46/61 | 34.0 | NM* |
| 8 | 5 | 0 | — | TTTM[e] | 26/43 | 2.8 | 10.0 |

[a]Shear strength, lb/100 sq. ft. (shear strength and bleeding are measured initially.)
[b]Plastic viscosity, cp,/yield point, lb/100 sq. ft.
[c]Gel strength, lb/100 sq. ft. (initial/10 minute)
[d]Water loss, ml in 30 min.
[e]Too thick to measure
*NM represents "Not Measured".

Referring to the initial properties in Runs 6, 7, and 8 it can be seen that the water loss was reduced from 4 to 3.8 to 2.8 on the addition of 1 lb/bbl and 5 lb/bbl of the NSFC to the workover fluid. Referring to the thermal aging data in Runs 6 and 7, the addition of 1 lb/bbl NSFC lowered water loss from 54 to 34 and shear strength from 650 to 550 lb/100 ft². No thermal aging data were recorded in Run 8. Referring to the pH values of Table II, it is evident that all of the compositions were distinctly alkaline as formulated.

EXAMPLE III

The NSFC inventive additive was mixed into a base fluid comprising saturated salt water weighted with 295 lb/bbl ground limestone and also containing 2 lb/bbl carboxymethyl cellulose, 2 lb/bbl asbestos fiber and 5 lb/bbl sodium carbonate. The three inventive fluid samples (Runs 10–12) tested contained, respectively, 1 lb/bbl, 2 lb/bbl and 3 lb/bbl of said NSFC additive. Test results are summarized in Table III.

TABLE III

| Run No. | CFR-2 lb/bbl | 300 F. Aging Days | Shear[a] Strength | PV/YP[b] | Gels[c] | Water Loss[d] mL/30 min | pH |
|---|---|---|---|---|---|---|---|
| 9 | 0 | 0.6 | 380 | 62/14 | 9/31 | 29.0 | NM |
| 10 | 1 | 0.6 | 340 | 91/28 | 10/22 | 13.4 | 8.7 |
| 11 | 2 | 0.6 | 300 | 110/50 | 14/38 | 10.0 | 8.6 |
| 12 | 3 | 0.6 | 265 | 118/52 | 15/31 | 5.6 | 8.5 |

[a]Shear strength, lb/100 sq. ft. (shear strength and bleeding are not measured initially.)
[b]Plastic viscosity, cp,/yield point, lb/100 sq. ft.
[c]Gel strength, lb/100 sq. ft. (initial/10 minute)
[d]Water loss, ml in 30 min.

Referring to the results in Table III it is evident that the addition of NSFC to the system reduced water loss progressively from 29 (see control run 9 with no NSFC) to 13.4, 10.0 and 5.6 at NSFC loadings, respectively, of 1 lb/bbl, 2 lb/bbl and 3 lb/bbl. This improved water loss control is unexpected because the naphthalene formaldehyde condensate is used as a dispersant in oil well cement rather than as a primary fluid loss control agent. It is also noteworthy that shear strengths were reduced as the NSFC loadings were increased and that the yield point values were increased. Referring to the pH values after thermal aging, it is apparent that all the compositions were still quite alkaline after the thermal aging tests.

Referring to the general trend of yield points and gel strengths in Table III, it is evident that the high temperature water loss control additive, i.e., NSFC, is not functioning as a dispersant and/or thinning agent in the instant compositions. If the NSFC additive was functioning as a dispersant and/or thinning agent, the yield points (YP) and gel strengths (gels) would exhibit significantly decreased values as the NSFC loadings increased from 1 to 2 to 3 lb/bbl, respectively, in test numbers 10, 11 and 12.

EXAMPLE IV

The NSFC (CFR-2) was mixed into a base fluid comprising saturated salt water weighted with 295 lb/bbl ground limestone and also containing 2 lb/bbl carboxymethyl cellulose, 0.5 lb/bbl asbestos fiber and 5 lb/bbl sodium carbonate. The two inventive fluid samples (Runs 14 and 15) tested contained, respectively, 1 lb/bbl and 2 lb/bbl of said CFR-2 additive. Test results are summarized in Table IV.

TABLE IV

| Run No. | CFR-2 lb/bbl | 300 F. Aging Days | Shear$^a$ Strength | PV/YP$^b$ | Gels$^c$ | Water Loss$^d$ mL/30 min | pH |
|---|---|---|---|---|---|---|---|
| 13 | 0 | 0 | — | 94/33 | 5/8 | 4.6 | 10.2 |
|  |  | 3 | 750 | 46/39 | 32/46 | 64 | 8.1 |
| 14 | 1 | 0 | — | 84/28 | 4/8 | 4.0 | 10.0 |
|  |  | 3 | 550 | 57/24 | 15/63 | 35 | 8.4 |
| 15 | 2 | 0 | — | 85/35 | 4/8 | 4.0 | 10.2 |
|  |  | 3 | 400 | 64/26 | 7/32 | 25 | 8.3 |

$^a$Shear strength, lb/100 sq. ft. (shear strength and bleeding are not measured initially.)
$^b$Plastic viscosity, cp/yield point, lb/100 sq. ft.
$^c$Gel strength, lb/100 sq. ft. (initial/10 minute)
$^d$Water loss, ml in 30 min.

Referring to the results in Table IV and especially to the water loss values after thermal aging, it is evident that the CFR-B 2 improves water loss control, i.e., 64 (no additives in Run 13) is significantly greater than 35 (1 lb/bbl CFR-2 in Run 14) and 25 (2 lb/bbl CFR-2 in Run 15). Shear strengths are also progressively decreased from 750 to 550 to 400 as the additive loading of CFR-2 was increased from 0 lb/bbl to 1 lb/bbl to 2 lb/bbl. A decrease in gel strength was also noted in this specific system. Referring to the pH values in Table IV, it is evident that the compositions were quite alkaline before and after the thermal aging tests.

EXAMPLE V

Comparison runs on a fluid similar to that in Example IV (Columns 7 & 8) of U.S. Pat. No. 4,304,300 were made to determine whether a fluid loss additive disclosed in the patent controlled the fluid loss of spacer fluid compositions disclosed in the patent. Spacer fluids ordinarily have a pH value of about 7 (neutral) because contact of an alkaline spacer fluid would be detrimental to cement. Consequently, the commonly used spacer fluids are usually characterized by pH values of about 7. Such spacer fluids are usually positioned between muds and cement in typical field applications.

In the comparison runs, CMC was used instead of CMHEC and perlite instead of nut hulls. Cellulose and derivatives are disclosed in the '300 patent at Column 3, line 39 and perlite is specifically disclosed at Column 3, line 15.

The test data are presented in Table V.

TABLE V

| | 18% NaCl Brine Comprising 555.6 lb/1,000 gal Perlite and 4,000 lb/1,000 gal Barite and Other Materials as Noted | | | | |
|---|---|---|---|---|---|
| Run No. | CMC* lb/1,000 gal | HPG* lb/1,000 gal | LBG* lb/1,000 gal | CFR-2* lb/1,000 gal | WL ml/30 min |
| 16 | 55.6 | 27.8 | 27.8 | 166.7 | 3.0 |
| 17 | — | 27.8 | 27.8 | 166.7 | 5.3 |
| 18 | 55.6 | 27.8 | 27.8 | — | 2.4 |
| 19 | — | — | — | 166.7 | 39.0** |

*CMC = Carboxymethyl cellulose
HPG = Hydroxypropyl guar
LBG = Locust bean gum
CFR-2 = Mixture of 10% by volume polyvinyl pyrrolidone and 90% by volume sodium salt of naphthalene sulfonic acid condensed with formaldehyde
**Settled In Run 16 all of the polymers recommended by the patentee were present in the comparison composition and the API water loss was 3 ml/30 min. Referring to Run 17, CMC was omitted from the composition and the water loss increased to 5.3 ml/30 min. In Run 18 the disclosed water loss additive was omitted and the water loss decreased to 2.4 from 3 in Run 16. The only polymer employed in Run 19 is the mixture of polyvinyl pyrrolidone and sodium salt of naphthalene sulfonate acid condensed with formaldehyde (CFR-2) and the water loss was 39 ml/30 min.

These results clearly show that CFR-2 does not control the fluid loss of spacer fluids disclosed in U.S. Pat. No. 4,304,300. In fact, comparing the results of Run 18 with no CFR-2 with those of Run 16 where CFR-2 is present, the presence of CFR-2 is detrimental.

I claim:

1. A method for improving the high temperature water loss property of aqueous alkaline clay-free wellbore completion and workover fluids having an initial pH of at least about 9 and densities ranging from about 9 to about 14 lb/gal comprising incorporating therein (1) an electrolyte selected from water soluble inorganic salts, (2) an acid soluble weighting agent, (3) carboxymethyl cellulose as a viscosifier, (4) asbestos as a suspending agent, and (5) a water loss additive comprising naphthalene sulfonate formaldehyde condensates in the form of monovalent or bivalent metal salts having a molecular weight ranging from about 300 to about 3,000.

2. A method according to claim 1 wherein said additive is an alkali metal salt of said condensate and said amount is at least about 0.5 lb/bbl of total workover fluid.

3. A method according to claim 1 wherein said additive is a sodium salt of said condensate and said amount ranges from about 0.5 to about 6 lb/bbl of fluid.

4. An aqueous alkaline clay-free well completion and workover fluid having an initial pH of at least about 9 and a density ranging from about 9 to about 14 lb/gal fluid having improved high temperature fluid loss properties containing (1) an electrolyte selected from water soluble inorganic salts, (2) an acid soluble weighting agent, (3) carboxymethyl cellulose as a viscosifier, (4) asbestos as a suspending agent, and (5) a water loss reducing amount of at least one additive comprising naphthalene sulfonate formaldehyde condensates in the form of monovalent or bivalent metal salts having a molecular weight ranging from about 300 to about 3,000.

5. A composition according to claim 4 wherein said additive is an alkali metal salt of a naphthalene sulfonate formaldehyde condensate and said amount is at least about 0.5 lb/bbl of total workover fluid.

6. A composition according to claim 4 wherein said additive is a sodium salt of a naphthalene sulfonate formaldehyde condensate and said amount ranges from about 0.5 to about 6 lb/bbl of fluid.

7. A workover fluid according to claim 4 wherein (1) is NaCl (2) is CaCO₃ (3) is carboxymethyl cellulose and (4) is asbestos and sodium carbonate is present as an alkaline reagent.

8. A composition according to claim 4 which contains, based upon one (1) bbl of fluid,
   (1) about 0.5 to about 6 lb of said fluid loss additive,
   (2) about 15 to about 400 lb acid soluble weighting agent,
   (3) about 1 to about 3 lb asbestos,
   (4) about 0.25 lb to about 3 lb of carboxymethyl cellulose, and
   (5) about 0.1 to about 10 lb/bbl of an alkaline reagent.

9. A composition according to claim 4 wherein
   (2) is limestone
   (3) is asbestos,
   (4) is carboxymethyl cellulose, and
   (5) is sodium carbonate.

10. In the method for completion or workover of a well penetrating a subterranean reservoir wherein an aqueous completion or workover fluid is passed through the well into contact with the subterranean reservoir as part of the completion and workover method, the improvement which comprises employing as the completion and workover fluid an alkaline clay-free well completion and workover fluid containing (1) an electrolyte selected from water soluble inorganic salts, (2) an acid soluble weighting agent, (3) carboxymethyl cellulose as a viscosifier, (4) asbestos as a suspending agent, and having an initial pH of at least about 9 and a density ranging from about 9 to about 14 lb/gal fluid having improved high temperature fluid loss properties containing a water loss reducing amount of at least one additive comprising naphthalene sulfonate formaldehyde condensates in the form of monovalent or bivalent metal salts having a molecular weight ranging from about 300 to about 3,000.

11. The method defined in claim 10 wherein said additive is an alkalie metal salt of a naphthalene sulfonate formaldehyde condensate and said amount is at least about 0.5 lb/bbl of total fluid.

12. The method defined in claim 10 wherein sodium carbonate is present as an alkaline reagent and
   (1) is NaCl,
   (2) is CaCO₃,
   (3) is carboxymethyl cellulose, and
   (4) is asbestos.

13. A method according to claim 10 wherein said completion and workover fluids are made with saturated salt water.

14. The method defined in claim 10 wherein the completion or workover fluid contains based upon one (1) barrel of fluid,
   (1) about 0.5 to about 6 lb of said water loss additive,
   (2) about 15 to about 400 lb weighting agent,
   (3) about 1 to about 3 lb asbestos,
   (4) about 0.25 lb to about 3 lb of carboxymethyl cellulose, and
   (5) about 0.1 lb to about 10 lb of alkaline reagent.

15. The method defined in claim 14 wherein
   (2) is limestone
   (3) is asbestos,
   (4) is carboxymethyl cellulose, and
   (5) is sodium carbonate.

* * * * *